United States Patent [19]

Stampfli

[11] 3,805,837
[45] Apr. 23, 1974

[54] FLUID-CONTROLLING VALVE
[75] Inventor: Harald Stampfli, Geneva, Switzerland
[73] Assignee: Lucifer S.A., Chemin Lucifer, Carauge-Geneva, Switzerland
[22] Filed: Apr. 18, 1972
[21] Appl. No.: 245,107

[30] Foreign Application Priority Data
Apr. 23, 1971 Switzerland.................. 5910/71

[52] U.S. Cl............................................. 137/625.6
[51] Int. Cl.............................................. F16k 3/385
[58] Field of Search....... 137/625.6, 625.66, 625.27, 137/625.64

[56] References Cited
UNITED STATES PATENTS
3,470,910  10/1969  Loveless ...................... 137/625.6
3,519,022  7/1970   Kwangho Chung et al. .. 137/625.64
3,529,629  9/1970   Cowan ......................... 137/625.6
3,670,771  12/1969  Dewberry ..................... 137/625.6

Primary Examiner—Henry T. Klinksiek
Assistant Examiner—Robert J. Miller
Attorney, Agent, or Firm—Emory L. Groff; Emory L. Groff, Jr.

[57] ABSTRACT

This valve, is of the type including a core moving alternatingly between two seats inside a casing to assume respectively its operative and inoperative positions and cannot be re-energized automatically when a transient drop in pressure has caused its de-energization. This safety feature, which is important when the valve controls a circuit-breaker, is obtained through a throttled connection between the annular clearance surrounding the core and adapted to be connected with an outlet and fluid-filled chambers at both ends of the casing. Said connection may comprise bores extending within the core.

4 Claims, 1 Drawing Figure

PATENTED APR 23 1974  3,805,837
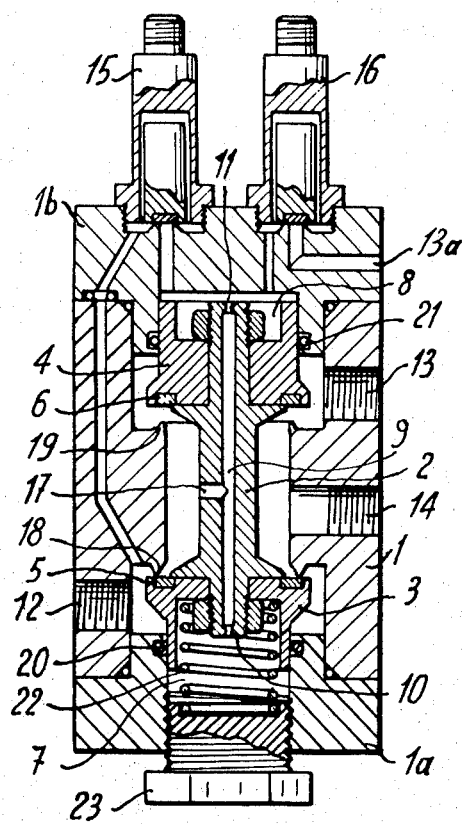

FLUID-CONTROLLING VALVE

The present invention covers self-energized fluid-controlling valves provided with at least three ways and it has for its object to increase the speed of operation of the conventional valves of the same type and furthermore to ensure the automatic return into its operative position when the pressure of the controlling fluid resumes its normal value after said valve has been fortuitously shifted into its inoperative position, for instance as a consequence of a sinking of the pressure of the fluid. This last characteristic feature is very important in the case where a valve is to control a pneumatic circuit-breaker in an electric system. In fact, in such a system, an untimely energization may lead to very serious consequences.

The invention has for its more specific object a valve of the type comprising a body inside which a movable core is adapted to reciprocate, which core carries at least two flap valves cooperating with corresponding seats formed in the body while a chamber is provided between each end of the movable core and the corresponding covers of the body and channels control the admission and the exhaust respectively of the fluid into at least one of said chambers in order to produce the self-energization of the chamber.

Now, according to the invention, the space surrounding the core within the body and extending between the two seats communicates with the chambers formed beyond the ends of the movable core through ports, the cross-section of which is smaller than the cross-sections provided for the energizing means.

The single FIGURE of the accompanying drawing illustrates diagrammatically and by way of example an embodiment of the improved valve according to the invention. Said single FIGURE is a highly simplified axial cross-section.

The valve illustrated includes a body 1 enclosing a housing in which may reciprocate a core 2 carrying two flap valves 3 and 4, each provided with a corresponding fluidtight packing 5, 6.

The two ends of the core and flap structure are of a cylindrical shape and are adapted to slide in the corresponding cylindrical portions of the covers 1a and 1b closing the body 1, said ends defining with said covers the two operative chambers 7 and 8. These two chambers are interconnected by means of a channel 9 extending longitudinally through the core 2 and ending with ports 10 and 11, the cross-section of each of which is much smaller than that of the actual channel.

The valve body is provided also with a tapped bore 12 inside which is threadedly secured a connection feeding a compressed fluid, with a tapped bore 13 inside which is threadedly secured an exhaust pipe and with another tapped bore 14 serving as an outlet port outside of which is threadedly secured a channel connecting the valve with the apparatus served by the latter, such as the cylinder of a pneumatic jack.

At the upper end of the valve, the chamber 8 is closed outwardly by the cover 1b carrying two pilot valves 15 and 16 each of which is of the two-way type. The pilot valve 15 is fed with fluid under pressure admitted through the threaded bore 12 and a further bore inside the body wall, while the pilot valve 16 is connected with an exhaust channel 13a through another bore inside the body wall.

The opening of the pilot valve 15 and the opening of the pilot valve 16 have for their result respectively the introduction of fluid under pressure into the chamber 8 and the exhaust of said fluid, said alternating operation of the pilot valves producing the reciprocation of the core 2 inside the body. The keeping of the valve core in its operative position illustrated is furthered by the presence of a port 17 connecting the longitudinal channel 9 in the valve core with the annular space surrounding the core 2 inside the body 1 between the two seats 18 and 19 formed in the latter for cooperation with the flaps 3 and 4.

The covers 1a and 1b are provided with fluidtight packings constituted by tore-shaped members 20 and 21 adapted to close the chambers 7 and 8. Inside the chamber 7 there is also housed a spring 22 fitted between the lower end of the flap valve 3 and the bottom of a recess in the plug 23 screwed into the cover 1a. The screwing of said plug to a variable extent provides means for adjusting the initial tensioning of the spring 22.

The operation of the above-described valve is as follows:

When the pilot valve is open, the compressed fluid is admitted into the chamber 8. A small fraction of said fluid passes into the channel 9 through the narrow port 11 and the resulting leak has no substantial action on the pressure prevailing inside the chamber 8, since the cross-section of the passageway feeding the fluid into said chamber is much larger than that of the port 11. Now, the pressure of the fluid prevails also in the lower part of the housing formed by the body 1 and consequently the core 2 is subjected to opposing forces exerted by the fluid under pressure against its opposite ends. The core is urged upwardly by the pressure acting on the annular surface of the flap valve 3, the outer diameter of which corresponds to the diameter of the seat 18, whereas its inner diameter corresponds to the diameter of the chamber 7. On the other hand, the pressure exerted inside the chamber 8 acts practically throughout the surface of the upper end of the flap valve 4 minus the surface defined by the port 11. The force urging the core 2 downwardly is thus much greater than the opposing force urging it upwards, so that there is obtained a speedy downward movement of the core which uncovers the seat 18 and closes the seat 19. It should be noted that the fluid contained in the chamber 7 escapes from the latter through the port 10 during this downward shifting of the core 2.

The pilot valve 15 can then be closed and the core 2 remains in its lower position under the action of the fluid pressure on the active surface constituted by the upper face of core 2. This active surface is larger than the area defined by the opening of the seat 19 and the difference between said surface and said area is an annular surface having an outer diameter equal to that of the chamber 8 and an inner diameter equal to that of the seat. It should be noted that for the operative position of the core 2, that is when the flap valve 3 is raised against its seat 18, the fluid under pressure which fills the part of the housing constituted by the valve body 1 located underneath the seat 19 passes through the bore 17, the longitudinal channel 9 and the port 11 into the chamber 8. Consequently, the core 2 remains in its upper operative position even if one of the pilot valves 15 and 16 shows a slightly defective fluidtightness. In fact, the loss of fluid leaking in such a case out of the chamber 8 would immediately be made up for by fluid entering said chamber 8 through the port 11.

When it is desired to close the valve, one opens the pilot valve 16 which may be electromagnetically controlled and this causes the fluid under pressure contained in the chamber 8 to be exhausted through the bore 13a, the cross-section of which is much larger than that of the narrow port 11. Since the pressure transmitted to the apparatus served by the valve prevailed also just before the pilot valve 16 was opened throughout the lower part of the housing within the body 1 extending underneath the seat 19, this pressure thus prevails also inside the channel 9 and in both chambers 7 and 8, and consequently, when the pilot valve 16 is actually opened, the core is subjected throughout the cross-section of its lower end to the pressure of the fluid. This produces a high speed upward thrust urging the core back in its upper inoperative position illustrated in the drawing.

If the pressure of the fluid fed through the tapped bore 12 drops below a predetermined value as a consequence, for instance, of a defect in the supply of fluid under pressure, the movable core 2 returns into the inoperative position illustrated as soon as the pressure prevailing inside the chamber 8 is no longer sufficient for balancing the pressure exerted by the spring 22. The chamber 8 is thus connected through the narrow bore 11, the channel 9 and the transverse radial bore 17, with the exhaust 13. Consequently, when the pressure of the fluid resumes its normal value, the core cannot return into its operative position as long as the pilot valve 15 has not been brought into its open position. This last feature is of a quite considerable interest whenever the valve serves for the control of a circuit-breaker in an electric system. In fact, it is very dangerous to allow a circuit which has been fortuitously broken to be unwillingly closed again after the cause of the de-energization has disappeared.

Of course, numerous modifications may be made to the valve described hereinabove and, in particular, the two pilot valves may be replaced by a single three-way pilot valve. At any rate, the pilot valves are not necessarily fitted on the valve body and can be fitted at any suitable point and be connected with the chamber 8 through a pipe, whereby a remote control system is obtained.

I claim:

1. A fluid-controlling self-energized valve providing at least three ways and comprising a body, the inside of which forms a substantially cylindrical casing provided with two annular seats facing each other, a movable core adapted to move longitudinally inside said casing and including at each end a flap valve cooperating with the corresponding seat, a chamber at each end of the casing, an annular clearance separating the core from the inner body wall between the two seats and communicating with an outlet port, means feeding fluid under pressure into and out of at least one of said chambers, at least an operative surface subjected to said pressure to produce the shifting of the core in the desired direction, wherein the improvement consists in throttled means connecting said chambers with said annular clearance, the free section of said throttled means being constant and smaller than the free section of said means feeding fluid under pressure, wherein the active surface of the chamber communicating with said means feeding fluid being larger than the opening of the nearest seat and the active surface of the other chamber being smaller than the opening of the other seat.

2. A fluid-controlling valve as claimed in claim 1, comprising yielding means pushing said core towards the chamber, the active surface of which is larger than the opening of the nearest seat.

3. A fluid-controlling valve as claimed in claim 2, wherein at least one of said chambers communicates with said annular clearance through a passage provided in said core.

4. A fluid-controlling self-energized valve providing at least three ways and comprising a body, the inside of which forms a substantially cylindrical casing provided with two annular seats facing each other, a movable core adapted to move longitudinally inside said casing and including at each end a flap valve cooperating with the corresponding seat, a chamber at each end of the casing, an annular clearance separating the core from the inner body wall between the two seats and communicating with an outlet port, means feeding fluid under pressure into and out of at least one of said chambers, at least an operative surface subjected to said pressure to produce the shifting of the core in the desired direction, wherein the improvement consists in throttled means connecting said chambers with said annular clearance, said throttled means comprising a longitudinal bore formed in the core, the ends of said bore opening through narrow ports into the corresponding chambers and a radial bore in said core connecting the longitudinal bore with said annular clearance, the free section of said throttled means being constant and smaller than the free section of said means feeding fluid under pressure, wherein the active surface of the chamber communicating with said means feeding fluid being larger than the opening of the nearest seat and the active surface of the other chamber being smaller than the opening of the other seat.

* * * * *